United States Patent
Peterson et al.

(10) Patent No.: US 10,762,519 B2
(45) Date of Patent: Sep. 1, 2020

(54) ON-LINE COUPON USE

(71) Applicant: Target Brands, Inc., Minneapolis, MN (US)

(72) Inventors: Sarah Roxanne Peterson, St. Paul, MN (US); Amber M. Reimer, Minneapolis, MN (US); Ananth Ranganath, Minneapolis, MN (US); Patrick Jon Vesperman, New Brighton, MN (US); Evan Jacob Hovorka, Plymouth, MN (US); Andrew Johnson, Minneapolis, MN (US); Raja Ramachandran, Bloomington, MN (US); John Howard Reinschmidt, Roseville, MN (US)

(73) Assignee: Target Brands, Inc., Minneapolis, MN (US)

( * ) Notice: Subject to any disclaimer, the term of this patent is extended or adjusted under 35 U.S.C. 154(b) by 677 days.

(21) Appl. No.: 14/626,253

(22) Filed: Feb. 19, 2015

(65) Prior Publication Data

US 2016/0247182 A1 Aug. 25, 2016

(51) Int. Cl.
*G06Q 30/02* (2012.01)
(52) U.S. Cl.
CPC ..... *G06Q 30/0222* (2013.01); *G06Q 30/0239* (2013.01)
(58) Field of Classification Search
CPC ........................................ G06Q 30/0207–0277
See application file for complete search history.

(56) References Cited

U.S. PATENT DOCUMENTS

| | | | |
|---|---|---|---|
| 6,026,370 A | 2/2000 | Jermyn | |
| 7,555,444 B1 | 6/2009 | Wilson et al. | |
| 2004/0049422 A1 | 3/2004 | Mortimer | |
| 2004/0249712 A1* | 12/2004 | Brown | G06Q 30/0217 705/14.19 |
| 2005/0144093 A1* | 6/2005 | Kassan | G06Q 30/06 705/26.3 |
| 2011/0106606 A1* | 5/2011 | Thordsen | G06Q 30/02 705/14.23 |
| 2011/0184796 A1* | 7/2011 | Miceli | G09F 3/0288 705/14.26 |
| 2012/0016732 A1* | 1/2012 | Boal | G06F 16/958 705/14.39 |
| 2012/0084122 A1* | 4/2012 | Boehle | G06Q 30/06 705/14.1 |

(Continued)

FOREIGN PATENT DOCUMENTS

WO 200205174 A1 1/2002

*Primary Examiner* — David J Stoltenberg
(74) *Attorney, Agent, or Firm* — Westman, Champlin & Koehler, P.A.; Theodore M. Magee

(57) ABSTRACT

A computer-implemented method involves receiving a promotional code for an offer and an identifier for a user as part of a request for a dynamic landing page user interface, wherein a database contains an indication that the user has selected the offer. The promotional code is used to identify at least one product associated with the promotional code. The dynamic landing page user interface is transmitted to display an identifier for the at least one product, a discount associated with the offer and a control for adding the at least one product to an electronic shopping cart.

17 Claims, 11 Drawing Sheets

(56) References Cited

U.S. PATENT DOCUMENTS

| | | | |
|---|---|---|---|
| 2012/0130792 A1* | 5/2012 | Polk, Jr. | G06Q 30/0225 705/14.26 |
| 2012/0323666 A1* | 12/2012 | King | G06Q 30/02 705/14.26 |
| 2013/0024261 A1* | 1/2013 | Main | G06Q 30/02 705/14.23 |
| 2013/0124288 A1 | 5/2013 | Carter et al. | |
| 2013/0191205 A1 | 7/2013 | Harkless, II et al. | |
| 2013/0304561 A1* | 11/2013 | Warner | G06Q 30/0226 705/14.33 |
| 2013/0332283 A1* | 12/2013 | Faith | G06Q 30/0239 705/14.64 |
| 2014/0180793 A1* | 6/2014 | Boal | G06Q 30/0245 705/14.43 |
| 2014/0180808 A1* | 6/2014 | Boal | G06Q 30/0245 705/14.53 |
| 2018/0150869 A1* | 5/2018 | Finnegan | G06Q 30/0239 |

* cited by examiner

ON-LINE COUPON USE

BACKGROUND

Retailers publish discounts and sales offers on the Internet. Consumers can select offers and redeem them during a transaction at a physical store. Alternatively, offers can be incorporated into an item displayed online such that adding an item to an electronic shopping cart automatically causes the offer associated with the item to be selected. For example, if an item is displayed on a web page as being 25% off, the 25% savings will be automatically selected if a user adds the item to their cart. In still other systems, after selecting items and placing them in the electronic shopping cart, the user can enter a coupon code to receive a discount on the items.

"Social media" includes a collection of Internet and/or cellular network technologies that allow people to share information about their lives. In many of these technologies, a list of friends or followers is associated with a particular user such that when the user updates information about their lives, their friends or followers are notified. In some social media settings, when a user takes an action on an Internet page, that action is automatically updated on the user's social media postings so that their friends and followers are made aware of the user's actions.

The discussion above is merely provided for general background information and is not intended to be used as an aid in determining the scope of the claimed subject matter. The claimed subject matter is not limited to implementations that solve any or all disadvantages noted in the background.

SUMMARY

A computer-implemented method involves receiving a promotional code for an offer and an identifier for a user as part of a request for a dynamic landing page user interface, wherein a database contains an indication that the user has selected the offer. The promotional code is used to identify at least one product associated with the promotional code. The dynamic landing page user interface is transmitted to display an identifier for the at least one product, a discount associated with the offer and a control for adding the at least one product to an electronic shopping cart.

In a further embodiment, a computer-readable medium has computer-executable instructions stored thereon that cause a processor to perform steps. The steps include displaying a set of available retail offers and receiving a selection of at least one of the available retail offers. Based on the selection, the at least one available retail offer is designated as a selected offer. A set of multiple selected offers and a control to redeem selected offers online are then displayed. Selection of the control is received and in response, a code for at least one of the multiple selected offers and a user ID for a user are transmitted to an online retail website.

In accordance with a further embodiment, a computer-implemented method includes displaying a set of available offers and receiving an input representing a selection of one of the available offers. Based on the input, an indication that the available offer was selected by a user is stored. A set of offers selected by the user is then displayed along with a control to request a page that facilitates online purchase of items associated with the selected offers.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments discussed below provide user interfaces that allow users to select offers provided by a social savings application. After the offers have been selected, the user can select a control to be directed to an online shopping page where the user can add items associated with the selected offers to an electronic shopping cart. In some embodiments, the online shopping page is a dynamic landing page that is dynamically generated to include items for each of the selected offers. For offers that can apply to more than one item, the dynamic landing page includes disambiguation controls that the user can set to add a particular item to the electronic shopping cart.

Figure 1:
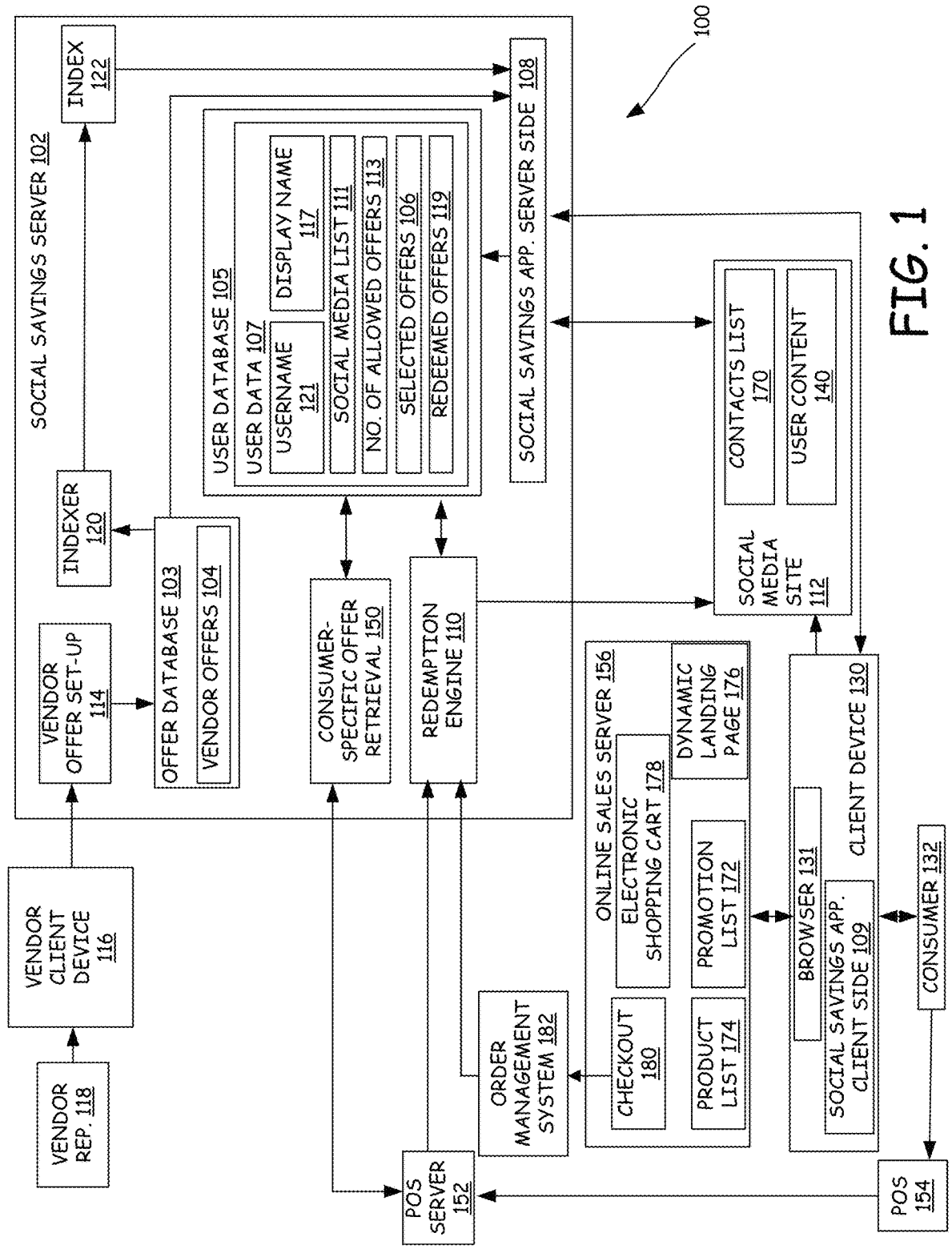
FIG. 1 is block diagram of a network environment used in various embodiments.

FIG. 1 provides a block diagram of elements used for setting, selecting and redeeming offers in the context of an offer sharing system 100. In FIG. 1, a social savings server 102 provides user interfaces to allow vendors to create and store vendor offers 104. To create new offers, a vendor representative 118 uses a vendor client device 116 to interact with a vendor offer set-up application 114. Vendor offer set-up application 114 may take the form of a collection of webpages having code behind that allow the webpages to execute application functions and to store and retrieve data in offer database 103. Using the webpages provided by vendor offer set-up application 114, the vendor is able to provide a description of the offer, list the products associated with the offer, the expiration date of the offer and to designate an image or video that is to accompany the offer.

Upon receiving the offer information, vendor offer set-up application 114 stores the offer information in offer database 103 as one of vendor offers 104. Thus, offer database 103 holds information about offers or discounts provided by vendors. An indexer 120 creates an index 122 that is keyed by words and product names found in vendor offers 104. For each term/product name, index 122 provides a list of offers that contain that term or product name.

Social savings server 102 also includes a social savings application formed of a social savings application server side 108 and a social savings application client side 109, which are referred to jointly as social savings application 108/109. Social savings application server side 108 provides instructions that are executed by social savings server 102 and social savings application client side 109 provides instructions that are executed by client device 130. In some embodiments, social savings application client side 109 is a stand-alone application that generates its user interfaces and interacts with social savings application server side 108. In such embodiments, social savings application 108/109 is referred to as an offer searching application, an offer selection application, and an offer sharing application. In other embodiments, social savings application client side 109 is a collection of web pages with code behind that are executed on a client device 130 by a browser 131. In such embodiments, social savings application 108/109 is referred to as an offer searching site, and offer selection site, and an offer sharing site.

Figure 2:
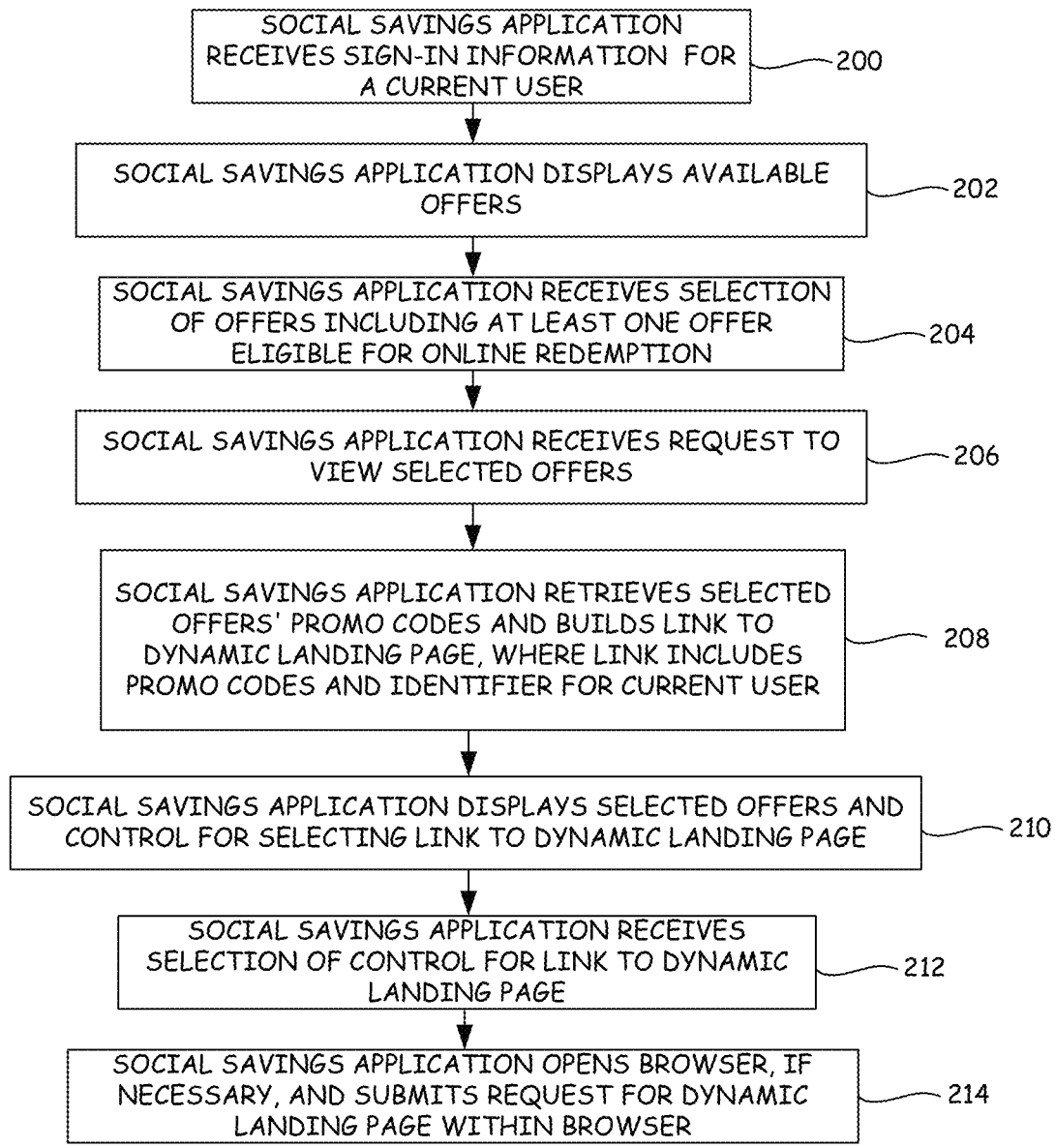
FIG. 2 is a block diagram of a method of displaying and receiving a selection of offers and providing a link to a page for online redemption of offers.
Figure 3:
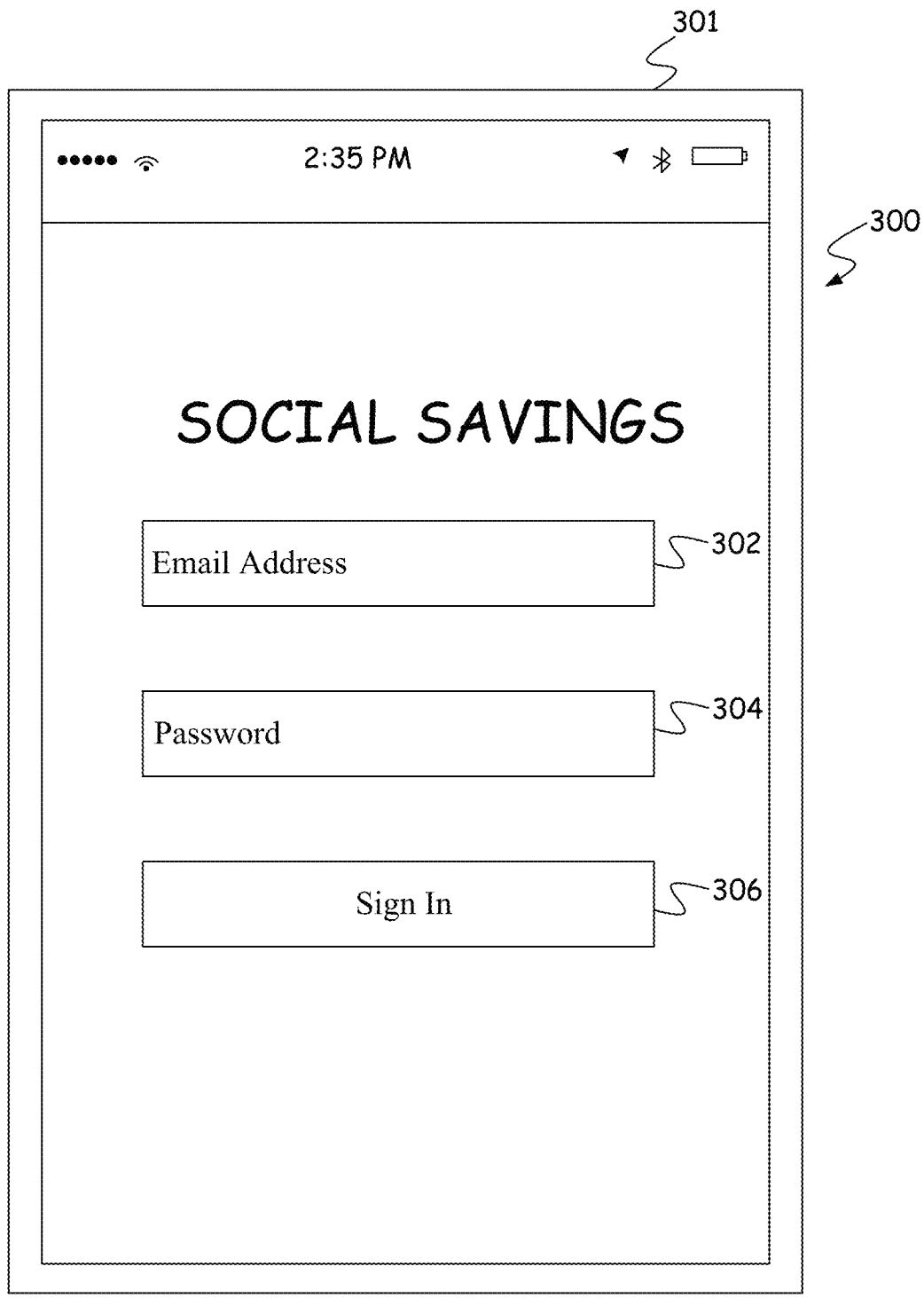
FIG. 3 is an example user interface for signing in to a social savings application.

FIG. 2 provides a flow diagram of a method for viewing available offers, selecting some of those offers and redeeming the offers online using social savings application 108/109. At step 200, social savings application 108/109 receives sign-in information for a current user. The sign-in information may be received in response to a login screen displayed on client device 130 by social savings application 108/109. This sign-in information can be provided through a sign-in user interface 300 on an exemplary client device 301 of FIG. 3. Exemplary client device 301 is an example of client device 130. In sign-in user interface 300, the current user provides a username in a username text box 302 and a password in password text box 304. The current user submits the username and the password using Sign In control 306. In the embodiment of FIG. 3, the username is an email address. Alternatively, the sign-in information may be received in response to a login screen provided by social media site 112 to client device 130. In such embodiments, social saving application 108/109 calls a login function on social media site 112. In response, social media site 112 presents the login screen to client device 130 and consumer 132 logs into the social media site 112. If the login is successful, social media site 112 provides the username for the consumer to social savings application 108/109 along with a token that can be used to gain access to information stored on social media site 112 for an account associated with the username.

At step 202, social savings application 108/109 displays a set of available retail savings offers from offer database 103. The set of available savings offers may be selected by social savings application 108/109 without input from consumer 132 or may be selected based on search criteria submitted by consumer 132. In embodiments that provide the set of available offers based on search criteria from consumer 132, social savings application 108/109 provides a search user interface to client device 130 that provides a text box where a consumer 132 may enter terms and product names to be searched. When consumer 132 submits a search query, social savings application 108/109 searches index 122 and retrieves all offers that match the search query. Social savings application 108/109 then returns the matching offers to client device 130 in a search results user interface.

Figure 4:
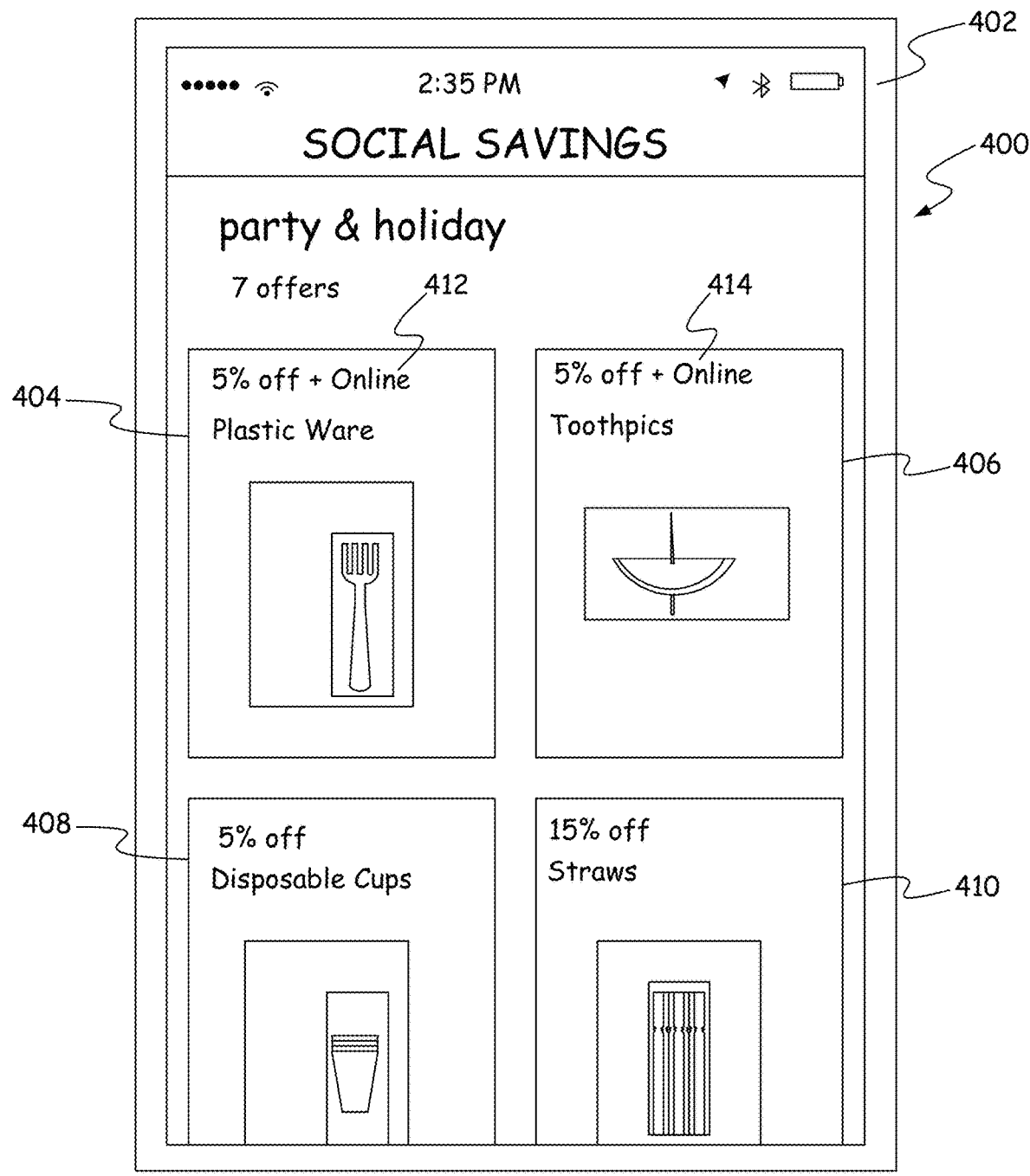
FIG. 4 is an example user interface displaying available social savings offers.
Figure 5:
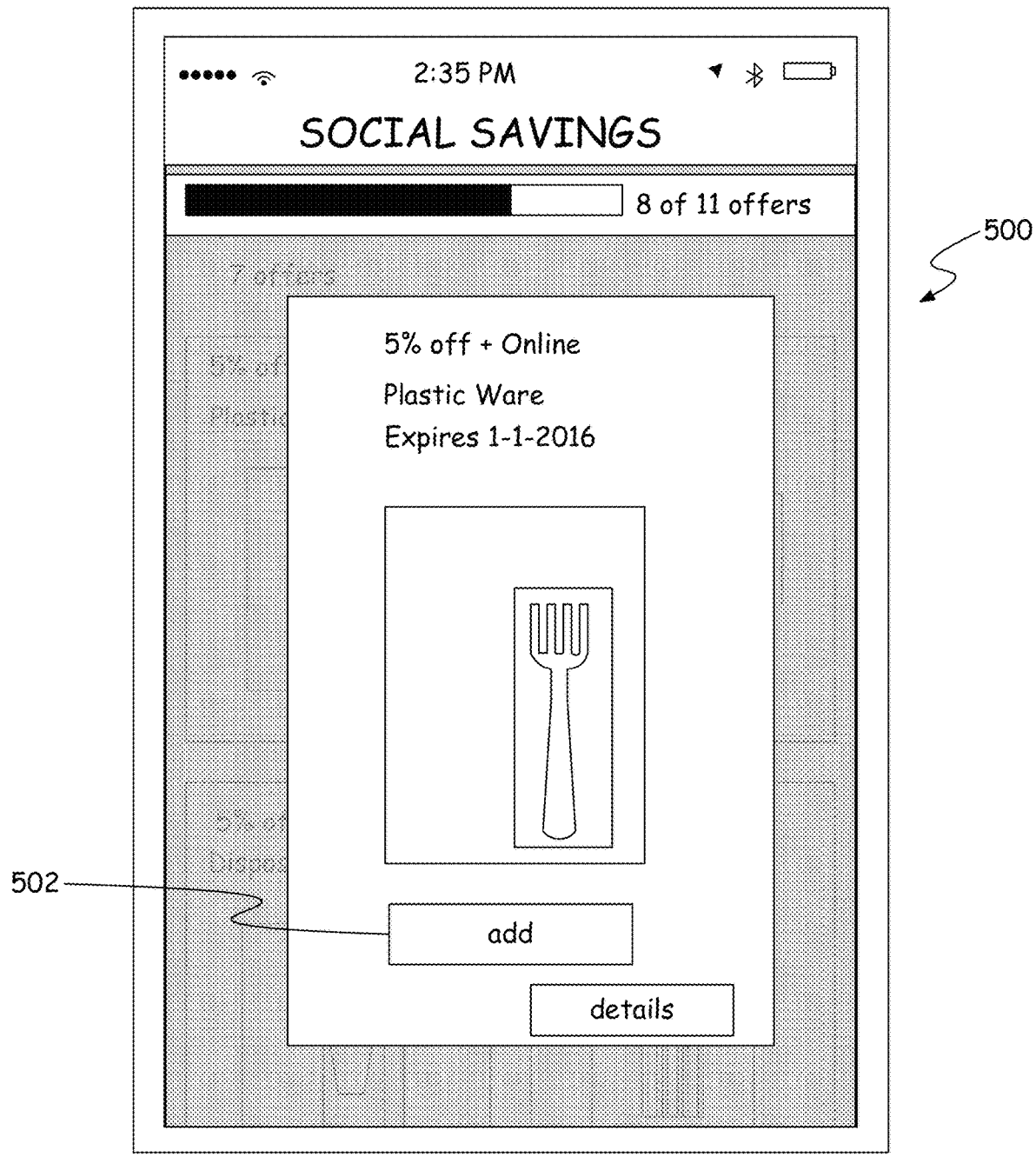
FIG. 5 is an example user interface displaying details of a social savings offer with a control for selecting the offer.

FIG. 4 shows an example user interface 400 on an exemplary client device 402 that provides a set of available offers in response to a user search. Exemplary client device 402 is an example of client device 130. The set of offers includes offers 404, 406, 408 and 410. The set of available offers can include offers that can be redeemed at a physical store and offers that can be redeemed online. As shown by text 412 and 414 of offers 404 and 406, identifiers are added to offers that can be redeemed online to differentiate them from offers that can only be redeemed at physical stores. Consumer 132 is able to select one of offers 404, 406, 408 and 410 in search results user interface 400 to display a details page. FIG. 5 provides an example of a details page 500 that is displayed when offer 404 is selected. In details page 500, and ADD control 502 is displayed that can be activated by consumer 132 to select the offer.

At step 204, social savings application 108/109 receives offer selections from consumer 132 including the selection of at least one retail offer that is eligible for online redemption. Social savings application 108/109 adds the selected offers to a user database 105 as part of selected offers 106 thereby designating the offers as selected offers. User database 105 is stored in memory on social savings server 102 and holds information about registered users of social savings application 108/109. In particular, for each user of social savings application 108/109, user database 105 contains a user data record 107 that includes a username 121 that uniquely identifies the user on social savings application 108, a display name 117 to be displayed on user interfaces generated by social savings application 108, social media list 111 that lists social media sites associated with the user, selected offers 106, also referred to as a group of discounts, selected by the user for later redemption, number of allowed offers 113 representing the maximum number of offers allowed in selected offers 106 at any one time, and redeemed offers 119 representing a set of offers that have been redeemed by the user in the past as well as the monetary value of the savings associated with each redeemed offer. Redeemed offers 119 also includes a total amount saved by the user redeeming offers at a retail store. In one embodiment, the amount of money a user has saved by redeeming offers includes amounts saved by redeeming offers at physical (brick-and-mortar) stores and at online stores. In some embodiments, the savings amount is a total amount saved since the user started using social savings application 108/109. In other embodiments, the savings amount is the amount the user has saved over some period of time such as year-to-date, the past year, and the past month, for example. In some embodiments, redeemed offers 119 does not include a list of offers that have been redeemed but instead only holds a total amount saved by redeeming offers.

As noted in the description of database 105, the selection of an offer is different from the redemption of an offer. When an offer is selected, it is designated as being available to the consumer for later redemption. When an offer is redeemed, the discount provided by the offer is applied to the consumer's purchase to reduce the amount paid by the consumer. Further, it should be noted that an offer may be selected before a product related to the offer is added to an electronic shopping cart.

Number of allowed offers 113 can be a constant number that is the same for all users of social savings application 108 or can be dynamic and user-specific such that it increases with certain actions of a user. For example, if a user invites social media contacts to join social savings application 108, the number of allowed offers 113 can be increased. In accordance with one embodiment, the number of allowed offers 113 is initially set to ten.

Figure 6:
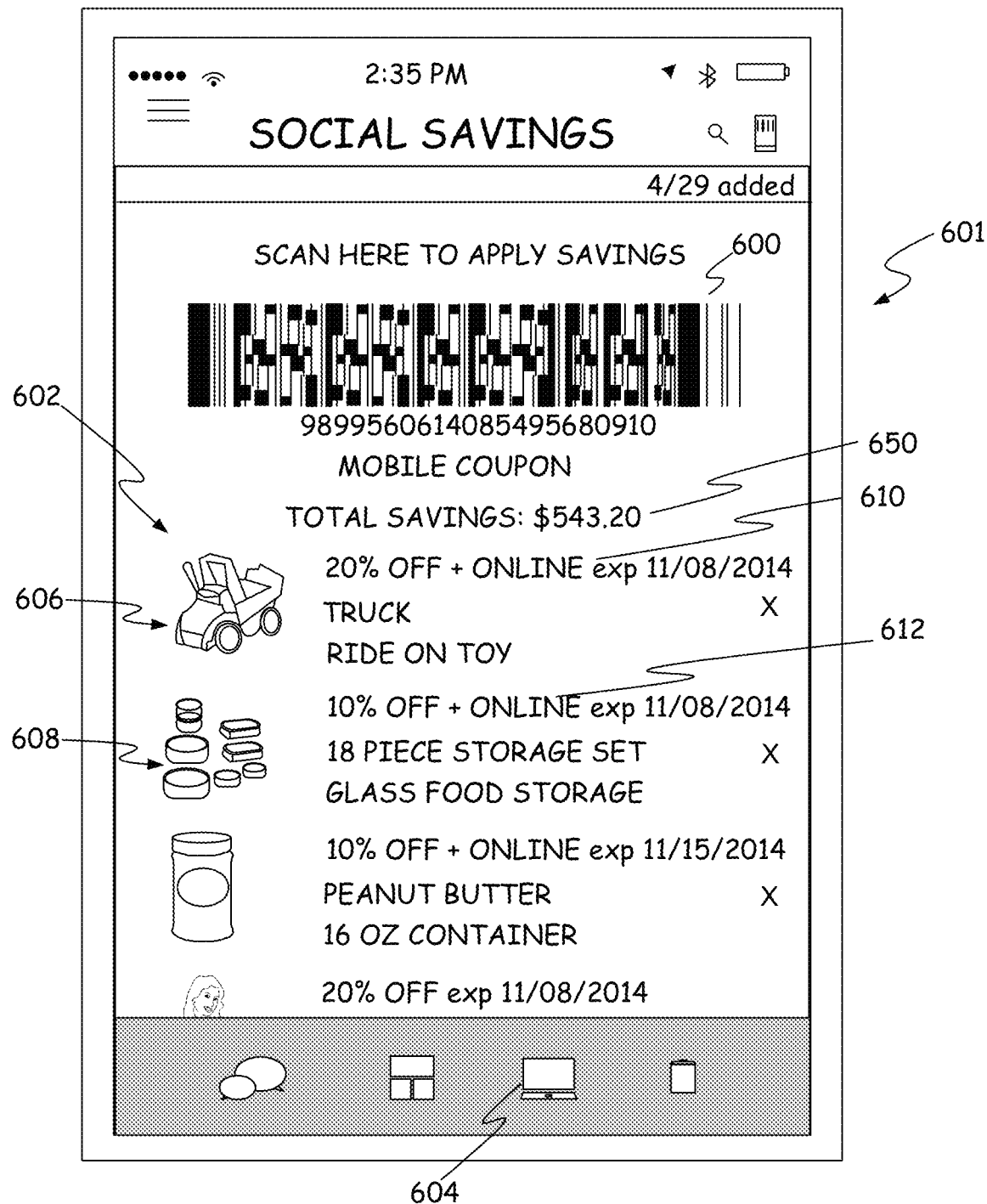
FIG. 6 is an example user interface showing selected social savings offers and a control for redeeming offers online.

Consumer 132 may redeem an offer by going to a retail store or making an online purchase. When consumer 132 goes to a retail store, they select products from the shelves of the store and bring the products to a point-of-sale register 154 for checkout. During checkout, consumer 132 provides a consumer identifier (ID) to point-of-sale register 154. For example, consumer 132 can slide a credit card or savings card through a magnetic reader attached to point-of-sale register 154 and thereby transfer the consumer ID to point-of-sale register 154. In other embodiments, consumer 132 may provide their consumer ID using a radio frequency signal provided by a radio frequency transmitter held by consumer 132, providing a Bluetooth® signal through a handheld device held by consumer 132 or providing a signal over a wireless network through a handheld device held by consumer 132, for example. In still further embodiments, consumer 132 may present an electronic barcode displayed on a mobile device held by consumer 132. An example of such an electronic barcode is shown in FIG. 6 as barcode 600 of user interface 601. The electronic barcode is read by a barcode reader at POS 154 to generate the consumer ID. The electronic barcode may be provided to the mobile device through social savings application 108/109. Point-of-sale register 154 provides the consumer ID to point-of-sale server 152, which then uses the consumer ID to request offers selected by the consumer associated with the consumer ID.

Specifically, point-of-sale server 152 passes the request to consumer-specific offer retrieval application 150, which accesses user database 105 to retrieve selected offers 106 for a username 121 that correlates to the consumer ID. In accordance with some embodiments, username 121 may not be the same as the consumer ID provided by consumer 132. In such cases, a mapping may occur in which the consumer ID provided by consumer 132 is converted into username 121 by one of point-of-sale register 154, point-of-sale server 152 or consumer-specific offer retrieval application 150. For example, a mapping table or a mapping algorithm may be used to convert a consumer ID provided at point-of-sale register 154 into a username as found in user database 105.

Consumer-specific offer retrieval application 150 returns selected offers 106 to point-of-sale server 152, which then forwards selected offers 106 to point-of-sale register 154. Point-of-sale register 154 compares the items listed in selected offers 106 to items being purchased in the current transaction. In order for point-of-sale register 154 to identify offers that are being redeemed, the offer information provided by consumer-specific offer retrieval application 150 should identify the products associated with an offer by, for example, providing a universal product code, a global trade item number, a stock keeping unit (SKU), or a retailer-specific identifier for the product. If items being purchased match items associated with one or more offers, each of the offers that match are designated as redeemed offers by point-of-sale register 154 and the offers are applied to the transaction to reduce the amount charged to consumer 132. In some embodiments, offers in selected offers 106 that are designated as being redeemable online can also be redeemed at the retail store. In other embodiments, some or all offers that are designated as being redeemable online can only be redeemed online and even if the consumer has selected an offer for an item they are purchasing at a retail store, the offer will not be applied if it has been designated as being redeemable only online. Point-of-sale register 154 then indicates to point-of-sale server 152 which of selected offers 106 were redeemed. Point-of-sale server 152 provides information about the redeemed offers to redemption engine 110, which removes the redeemed offers from selected offers 106 and adds the redeemed offers to redeemed offers 119. Removing the redeemed offers from selected offers 106 and adding them to redeemed offers 119 can involve changing a status of the offers from "selected" to "redeemed" in user data 107.

Some or all of the selected offers can also be redeemed online if the offers have been marked as being eligible for online redemption. To redeem offers online, a user first submits a request to social savings application 108/109 to view the selected offers at step 206. In response, social savings application 108/109 retrieves selected offers 106 including promotional codes, also referred to as promo codes, associated with those selected offers. At step 208, social savings application 108/109 builds a link to a dynamic landing page where the link includes a request for the dynamic landing page, the retrieved promo codes for the selected offers that can be redeemed online and an identifier for the current user such as username 121. In some instances, not all of the selected offers can be redeemed online. In such instances, the link does not include the promo codes of offers that cannot be redeemed online. In some embodiments, the request for the dynamic landing page is an HTTP GET function for the http address of the dynamic landing page. At step 210, social savings application 108/109 displays the set of selected offers and a control for selecting the link to the dynamic landing page. The control is also considered a control to redeem selected offers online since selection of the control will cause a user interface to be displayed in which the selected offers can be redeemed online. Note the set of selected offers are displayed before items have been placed in an electronic shopping cart. Thus, a user is able to select offers without having to also select items for inclusion in an electronic shopping cart.

FIG. 6 provides an example of a user interface showing a listing or set 602 of selected offers and a link or control 604 to the dynamic landing page. In set 602, indications of which of the multiple selected offers may be redeemed online are displayed. For example, offers 606 and 608 include respective text 610 and 612 that indicate that offers 606 and 608 are eligible for online redemption. The user interface of FIG. 6 also displays an amount saved 650, which is the amount the user has saved on purchases of items by redeeming previously selected offers including previously selected offers that were redeemed online and previously selected offers that were redeemed at physical stores. To redeem the selected offers that are eligible for online redemption, the consumer selects dynamic landing page control 604 and social savings application 108/109 receives this selection at step 212.

In response to the selection of control 604 for the dynamic landing page, social savings application 108/109 opens a browser 131 on client device 130, if necessary, at step 214. If browser 131 is currently open on client device 130, social savings application 108/109 opens a new tab in some embodiments and in other embodiments uses a currently open tab to submit a request for the dynamic landing page using the information in the link to the dynamic landing page. In embodiments in which social savings application client side 109 is currently being executed within browser 131, social savings application 108/109 can use the tab currently being used to display the user interfaces of social savings application 108/109 to submit the request for the dynamic landing page. Submitting the request for the dynamic landing page involves transmitting the promo codes for only the selected offers that can be redeemed online and the identifier for the current user to an online retail website identified by the HTTP address in the link of control 604.

Figure 7:
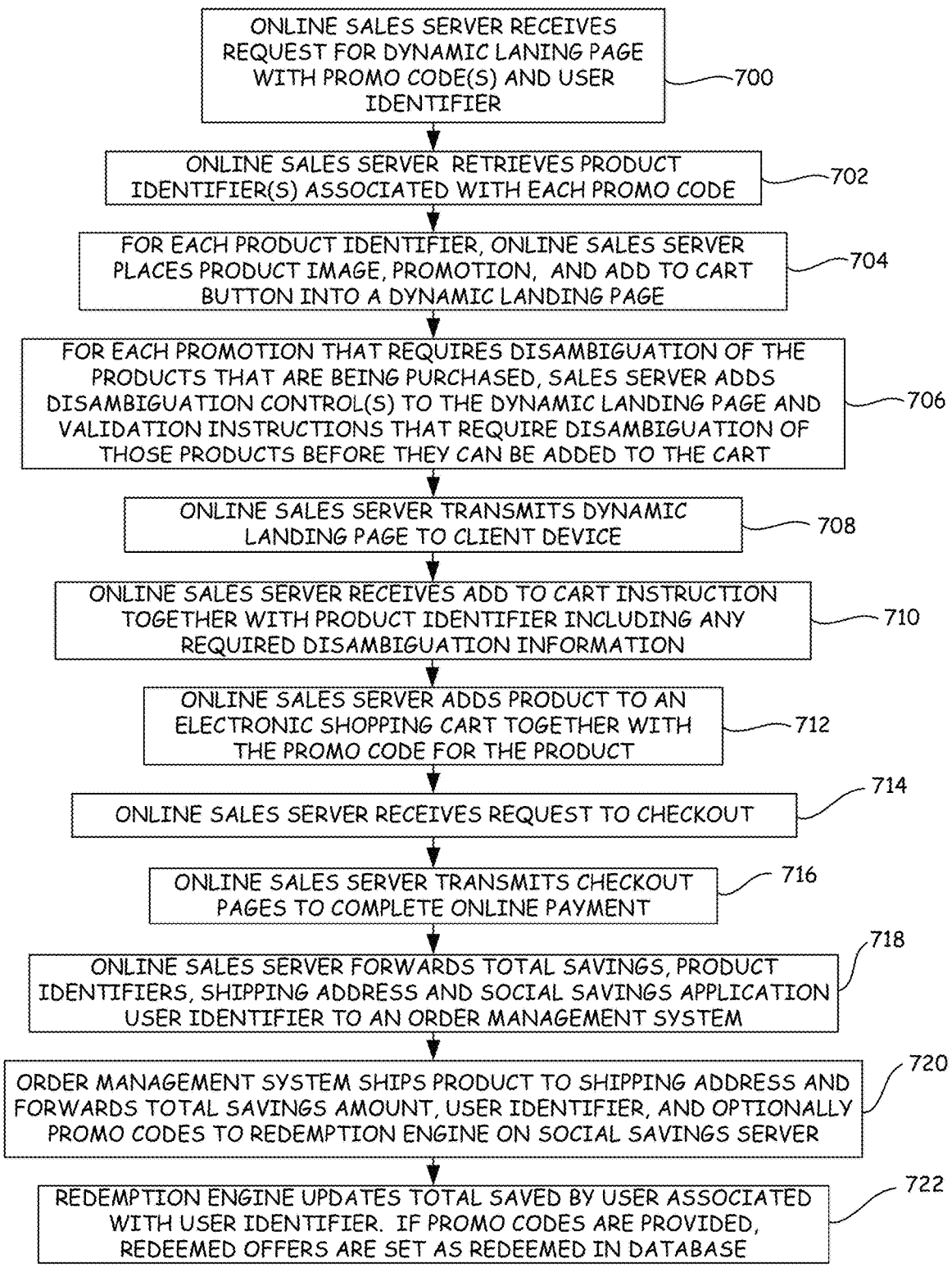
FIG. 7 is a flow diagram of a method of redeeming offers online.

FIG. 7 provides a flow diagram of steps performed by an online sales server 156 and an order management system 182 to facilitate online redemption of social savings offers. At step 700, online sales server 156 receives the request for the dynamic landing page including the promo codes and user identifier that were included as part of the link to the dynamic landing page. At step 702, online sales server 156 uses the promo codes to identify at least one product associated with each promo code. In one embodiment, the products are identified by retrieving product identifiers associated with each promo code from a promotion list 172 that associates promo codes with product identifiers. Each product identifier is tied to a particular product but a single promo code may be associated with multiple product identifiers. For example, if a product comes in different sizes, each size of the product may have its own product identifier in which case the promo code can be applied to the purchase of any sizes of that item. Online sales server 156 also retrieves a promotion description from promotion list 172 for each promo code.

At step 704, online sales server 156 uses the product identifiers to access a product list 174 and retrieve a product image for each product identifier. If multiple product identifiers were provided for a single promo code, only a single image is retrieved. For each promo code, online sales server 156 then places the product image, the promotion description and an ADD TO CART button in a dynamic landing page 176.

At step 706, if a promotion requires disambiguation of which products are being purchased with the promotion, online sales server 156 adds disambiguation controls to dynamic landing page 176 for that promotion. Promotions that require disambiguation are those that can be applied to multiple different product identifiers. Examples of disambiguation controls can include controls for selecting a size, color, quantity, brand and/or style, for example. In some embodiments, online sales server 156 also adds validation instructions that require disambiguation of the products before a product can be added to the cart.

Figure 8:
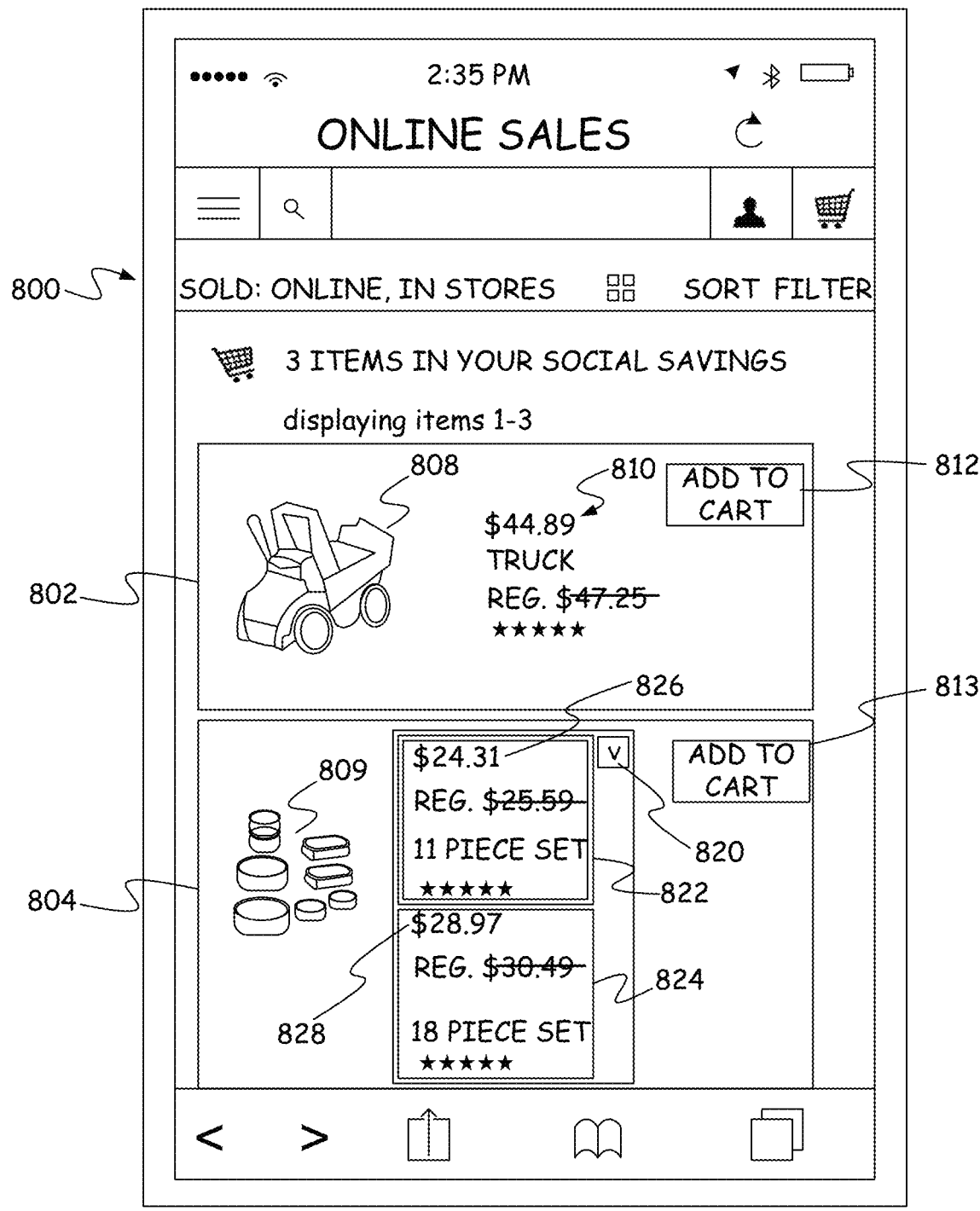
FIG. 8 is an example user interface showing a dynamic landing page.

At step 708, online sales server 156 transmits dynamic landing page user interface 176 to browser 131 on client device 130. FIG. 8 provides an example user interface 800 displaying an exemplary dynamic landing page. In user interface 800, two product sections or areas 802, and 804 are provided. Each product section includes a product identifier such as respective product images 808 and 809, and a control for adding the product to an electronic shopping cart such as respective ADD TO CART buttons 812 and 813. Product area 802 also includes promotion information 810 that describes the savings or discount that the consumer will receive by adding the product to their cart. Product area 804 includes disambiguation control 820 which is used to disambiguate the quantity of the item being purchased. In particular, when selected as shown in FIG. 8, disambiguation control 820 provides two alternative quantities 822 and 824, which each have different respective discounted prices 826 and 828. The consumer can select one of quantities 822 and 824 to identify which quantity of the product is to be added to the cart when ADD TO CART button 813 is selected and thereby indicate which discounted price is to be applied. Although disambiguation control 820 is shown as a pull-down control in FIG. 8, those skilled in the art will recognize that other controls may be used such as carousel controls, for example.

At step 710, online sales server 156 receives an add-to-cart instruction when consumer 132 selects an ADD TO CART button from dynamic landing page 176 on browser 131. In response, at step 712, online sales server 156 adds the product to an electronic shopping cart 178 for the current user. When an ADD TO CART button is selected on the dynamic landing page, the dynamic landing page is updated to indicate that the item has been added to the electronic shopping cart. The other products and promotional codes remain on the dynamic landing page as well as the ADD TO CART button for the other products and promotions. Thus, the consumer 132 is able to select to add each of the products of each of the promotions to their electronic shopping cart 178 through dynamic landing page 176.

Figure 9:
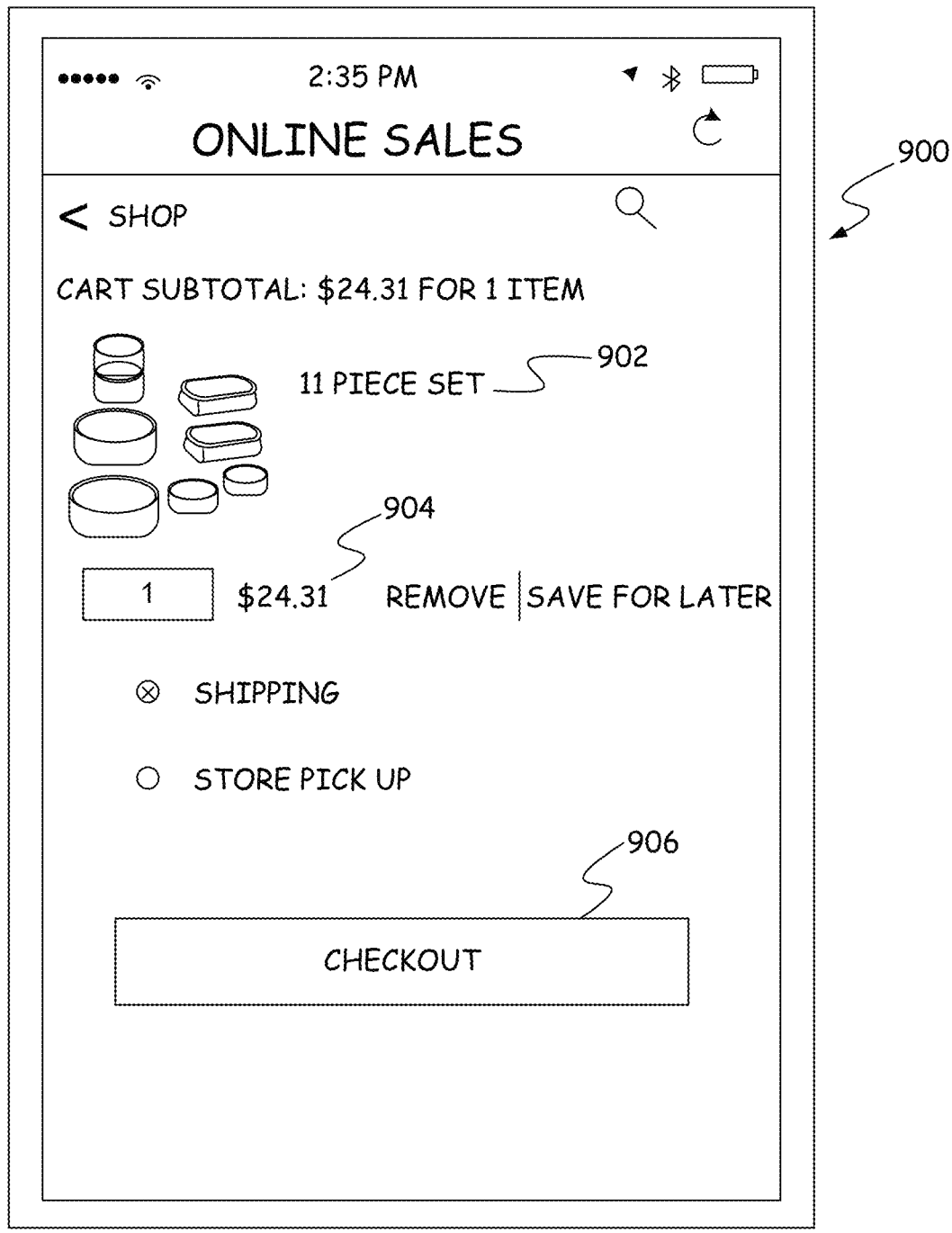
FIG. 9 is an example user interface showing the contents of an electronic shopping cart.

FIG. 9 depicts a user interface showing an electronic shopping cart with products and corresponding promotions that have been selected through dynamic landing page 176. Shopping cart user interface 900 includes selected product 902, corresponding promotional offer 904 and checkout button 906.

Figure 10:
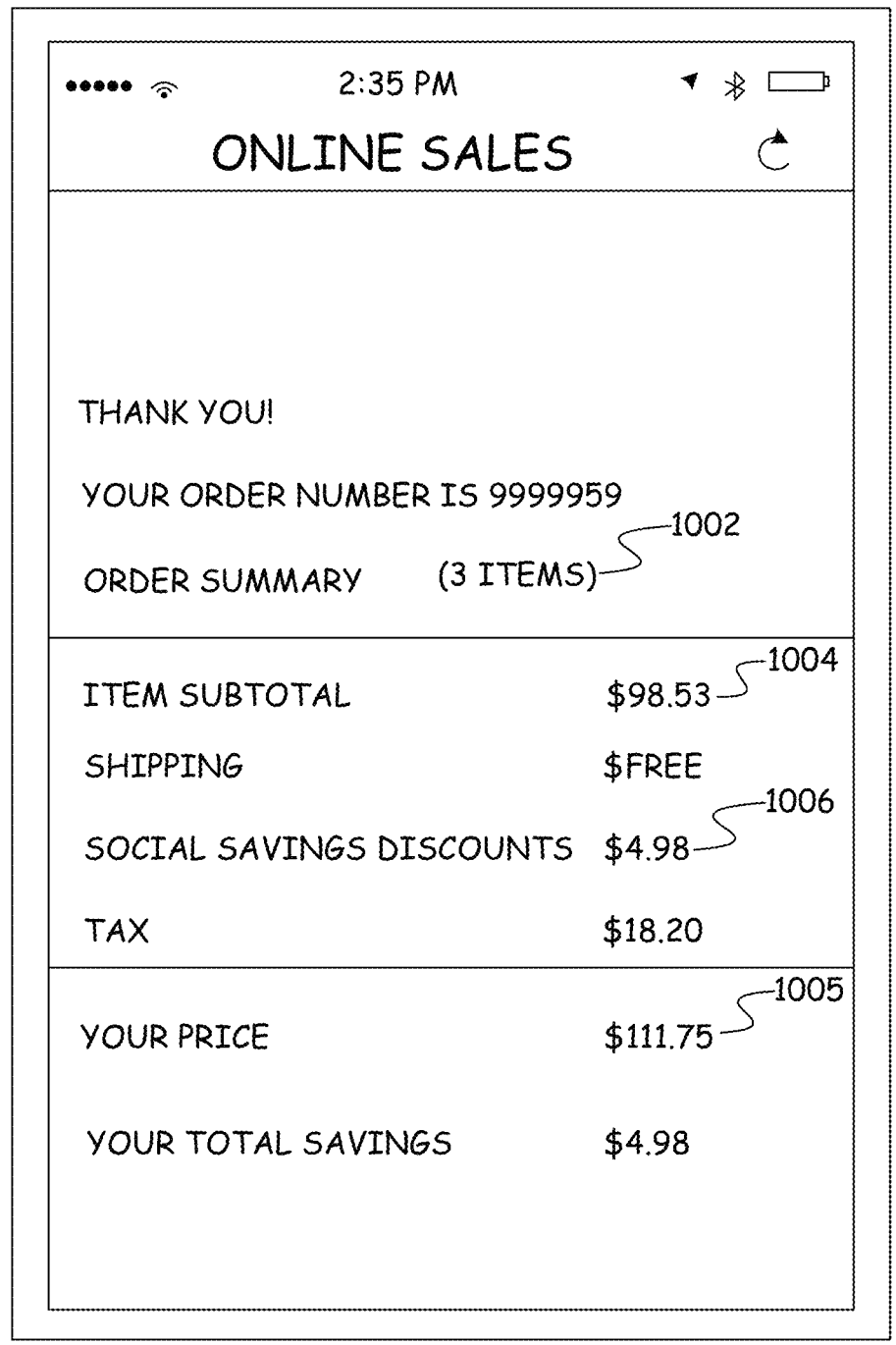
FIG. 10 is an example user interface showing an online purchase summary.

At step 714, online sales server 156 receives a request to checkout when consumer 132 selects checkout button 906 of FIG. 9. In one embodiment, checkout button 906 may be selected when fewer than all of the products on dynamic landing page 176 have been added to the electronic shopping cart. In other words, the user does not have to purchase every item that is displayed on dynamic landing page 176 but instead may select to use a subset of the offers provided on dynamic landing page 176. In response to the selection of checkout button 906, online sales server 156 initiates checkout routine 180 which transmits checkout pages to browser 131 on client device 130 to complete the online purchase transaction of the items in the electronic shopping cart. In accordance with one embodiment, a total amount saved by applying the discounts associated with the selected offers is determined and at least one of the checkout pages provides the total amount saved as shown in checkout page 1000 of FIG. 10. In FIG. 10, a summary page is shown indicating the number of items that have been purchased 1002, the total cost of the purchases 1004, the price paid 1005 and the total amount saved using the selected offers from the social savings application 1006.

At step 718, checkout instructions 180 of online sales server 156 forwards the total amount saved using the selected offers, the product identifiers, a shipping address, and a social savings application user identifier to order management system 182. At step 720, order management system 182 ships the products based on their product identifier to the shipping address and forwards the total amount saved using the selected offers from the social savings application, the social savings application user identifier and optionally the promo codes to redemption engine 110 of social savings server 102. At step 722, redemption engine 110 updates the total saved by the user associated with the user identifier in user database 105 by adding the total saved provided by order management system 182 to the previous total amounts saved in redeemed offers 119. If order management system 182 provides promo codes, redemption engine 110 can also update redeemed offers 119 to indicate which offers have been redeemed.

Figure 11:
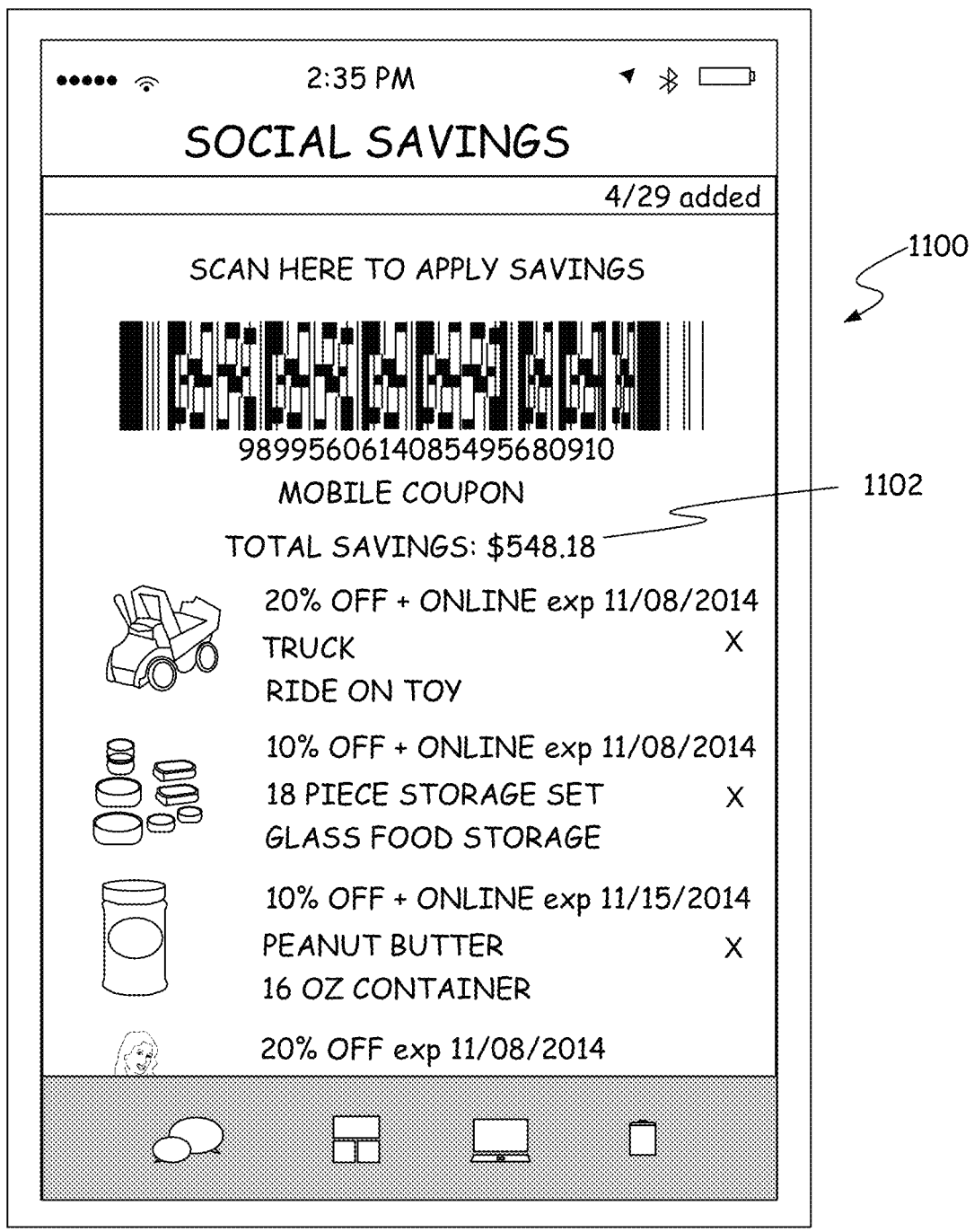
FIG. 11 is an example user interface showing an updated total amount saved that includes an amount saved through online redemption of social savings offers.

After the total saved has been updated in user database 105, a user interface such as user interface 1100 of FIG. 11 is provided when consumer 132 opens social savings application 108/109. User interface 1100 shows an updated total saved amount 1102 that includes the amount saved through the online redemption of social savings offers described above. In particular, comparing total saved amount 1102 to total saved amount 650 of FIG. 6, it can be seen that the total amount saved has increased by the amount saved through the online redemption of FIG. 10.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A computer-implemented method comprising:
   receiving at an online retail website a plurality of promotional codes for a plurality of respective offers as part of a request for a dynamic landing page user interface where the request is provided in response to selection of a single control provided on a page displaying the plurality of respective offers as previously selected offers;
   for each promotional code in the plurality of promotional codes, using the promotional code to identify a product associated with the promotional code; and
   transmitting the dynamic landing page user interface to display for each promotional code in the plurality of promotional codes:
      an identifier for the product associated with the promotional code,
      a discount associated with the promotional code's offer, and
      a shopping cart control for adding the product associated with the promotional code to an electronic shopping cart.

2. The computer-implemented method of claim 1 further comprising:
   receiving an indication that one of the controls for adding at least one product to the electronic shopping cart has been selected and in response adding the corresponding at least one product to the electronic shopping cart;
   completing a purchase transaction of the at least one product added to the shopping cart by applying the discount associated with the promotional code's offer for the at least one product;
   determining an amount saved by the application of the discount; and
   sending the amount saved and an identifier for the user to a server that contains an indication that the user had selected the offer.

3. The computer-implemented method of claim 1 wherein using the promotional code to identify at least one product associated with the promotional code comprises identifying multiple products associated with the promotional code.

4. The computer-implemented method of claim 3 wherein transmitting a page comprises transmitting a control to allow a user to disambiguate which of the multiple products are to be added to the electronic shopping cart.

5. The computer-implemented method of claim 4 further comprising:
   receiving an indication that one of the respective controls for adding a respective product to the electronic shopping cart has been selected and in response adding the respective product to the electronic shopping cart;
   completing a purchase transaction of the respective product added to the shopping cart by applying the respective discount associated with the respective product;
   determining an amount saved by the application of the respective discount; and
   sending the amount saved and an identifier for the user to a server that contains an indication that the user had selected the respective offer.

6. The computer-implemented method of claim 5 wherein completing a purchase transaction of the respective product added to the shopping cart comprises completing a purchase transaction of fewer than all of the respective products transmitted on the dynamic landing page user interface.

7. A non-transitory computer-readable medium having computer-executable instructions stored thereon, the computer-executable instructions cause a processor to perform steps comprising:
   displaying a set of available retail offers;
   receiving a selection of at least one of the available retail offers and based on the selection, designating the at least one available retail offer as a selected offer;
   displaying a set of multiple selected offers and a single control to redeem selected offers online wherein the step of displaying multiple selected offers is performed before items have been placed in an electronic shopping cart;
   receiving a selection of the single control; and
   transmitting a respective code for each of the multiple selected offers to an online retail website in response to the selection of the single control to request a single page comprising item descriptions for items related to each of the transmitted codes.

8. The non-transitory computer-readable medium of claim 7 wherein displaying a set of available retail offers comprises displaying retail offers that can be redeemed at physical stores and offers that can be redeemed at the online retail website.

9. The non-transitory computer-readable medium of claim 7 wherein transmitting a code for at least one of the multiple selected offers to an online retail website comprises transmitting the code as part of a request for a dynamic landing page of the online retail web site.

10. The non-transitory computer-readable medium of claim 7 wherein displaying a list of multiple selected offers comprises displaying an indication of which of the multiple selected offers may be redeemed online.

11. The non-transitory computer-readable medium of claim 10 wherein transmitting a code comprises transmitting codes only for offers that had a displayed indication that the offers could be redeemed online.

12. The non-transitory computer-readable medium of claim 7 further comprising displaying an amount saved that is based on offers redeemed online and offers redeemed at physical stores.

13. A computer-implemented method comprising:
   displaying a set of available offers;
   receiving an input representing a selection of one of the available offers;
   based on the input, storing an indication that the available offer was selected by a user;
   displaying a plurality of offers selected by the user along with a single control to request a page that facilitates online purchase of items associated with each of the plurality of selected offers;
   receiving an input representing selection of the single control and in response sending a request for the page that facilitates online purchase of items associated with each of the plurality of selected offers; and receiving and displaying the page that facilitates online purchase of items associated with the plurality of selected offers such that for each of the plurality of selected offers, the page provides a respective add to cart button such that when the add to cart button for a selected offer is selected, an item associated with the selected offer is added to an electronic shopping cart of the user.

14. The computer-implemented method of claim 13 further comprising retrieving an amount the user has saved on purchases of items by redeeming previously selected offers and displaying the amount saved on purchases with the set of offers selected by the user.

15. The computer-implemented method of claim 13 wherein the amount the user has saved on purchases of items by redeeming previously selected offers comprises a sum of an amount the user saved by redeeming previously selected offers at physical stores and the amount the user saved redeeming previously selected offers online.

16. The computer-implemented method of claim 13 wherein displaying a set of offers selected by a user further comprises displaying an indication of which selected offers can be redeemed online.

17. The computer-implemented method of claim 13 wherein the page that facilitates online purchase of items associated with the plurality of selected offers further comprises for at least one selected offer, a disambiguation control that displays a plurality of products that can be purchased using the selected offer and that allows the user to select at most one of the displayed plurality of products to add to the shopping cart when the add to cart button for the selected offer is selected.

* * * * *